United States Patent
Bharath et al.

(10) Patent No.: US 10,290,027 B2
(45) Date of Patent: May 14, 2019

(54) DYNAMICALLY SELECTED BACKGROUND MUSIC FOR PERSONALIZED AUDIO ADVERTISEMENT

(71) Applicant: Pandora Media, Inc., Oakland, CA (US)

(72) Inventors: Shriram Bharath, Oakland, CA (US); Jacek Adam Krawczyk, San Francisco, CA (US); Christopher Irwin, Los Altos, CA (US)

(73) Assignee: Pandora Media, LLC, Oakland, CA (US)

( * ) Notice: Subject to any disclaimer, the term of this patent is extended or adjusted under 35 U.S.C. 154(b) by 1022 days.

(21) Appl. No.: 14/500,777

(22) Filed: Sep. 29, 2014

(65) Prior Publication Data

US 2016/0092936 A1    Mar. 31, 2016

(51) Int. Cl.
*G06Q 30/02* (2012.01)
*H04L 29/06* (2006.01)

(52) U.S. Cl.
CPC ..... *G06Q 30/0276* (2013.01); *G06Q 30/0269* (2013.01); *H04L 65/602* (2013.01)

(58) Field of Classification Search
CPC ........... G06Q 30/0251; G06Q 30/0269; G06Q 30/0276; H04L 65/602
See application file for complete search history.

(56) References Cited

U.S. PATENT DOCUMENTS 7,075,000 B2   7/2006 Gang et al.
7,102,067 B2   9/2006 Gang et al.
2003/0014310 A1   1/2003 Jung et al.
2004/0093354 A1*  5/2004 Xu .................... G06F 17/30017
2009/0204402 A1   8/2009 Marwaha et al.
2010/0199833 A1*  8/2010 McNaboe ............ G10H 1/0025
                                                                84/625
2012/0041954 A1   2/2012 Curtis et al.
(Continued)

FOREIGN PATENT DOCUMENTS

KR   10-2003-0051486 A    6/2003

OTHER PUBLICATIONS

PCT International Search Report and Written Opinion for PCT/US2015/047978, dated Dec. 16, 2015, 9 Pages.

*Primary Examiner* — Ilana L Spar
*Assistant Examiner* — Robert C Johnson
(74) *Attorney, Agent, or Firm* — Fenwick & West LLP

(57) ABSTRACT

A content server system provides a client device with content including an audio advertisement with personalized background music. The content server selects a vocal advertisement received from an advertiser for presentation to a user of a client device. The content server obtains content data describing audio content provided to the client device as part of the stream of audio content. The content server obtains content data describing audio content provided to the client device as part of the stream of audio content. The content server identifies candidate background music items and selects background music from the candidate background music items based on the obtained content data. The client device is provided with the selected background music and the selected vocal advertisement. The client device plays an audio advertisement comprising the background music played concurrently with the vocal advertisement.

11 Claims, 7 Drawing Sheets

(56) References Cited

U.S. PATENT DOCUMENTS

2012/0042337 A1* 2/2012 De Bonet .............. G06Q 30/02
　　　　　　　　　　　　　　　　　　　　　725/34
2013/0064385 A1　　3/2013　Jeong et al.

* cited by examiner

DYNAMICALLY SELECTED BACKGROUND MUSIC FOR PERSONALIZED AUDIO ADVERTISEMENT

BACKGROUND

1. Field of Art

The present invention generally relates to creation and delivery of audio advertisements, and, more specifically, to dynamically selecting background music for audio advertisements.

2. Background of the Invention

Providers of digital content may generate revenue by inserting advertisements into the digital content and receiving payment from advertisers according to a cost-per-impression (CPI) model or a pay-per-click (PPC) model. For example, the providers may insert audio advertisements between songs in an audio content stream provided to client devices. The CPI or PPC that advertisers are willing to pay for an advertisement depends on the advertisement's effectiveness. To improve advertisement effectiveness, digital content promoters deliver targeted advertisements that are more likely than a generic advertisement to engage users.

Traditional advertisements often include background music (e.g., rock songs in car commercials). However, advertisers select background music to accompany the non-musical content of the advertisement. Accordingly, the background music in an advertisement may clash with music in surrounding content unless the background music and the surrounding content match by random circumstance. Advertisements that clash with surrounding content disrupt a user's experience and accordingly reduce engagement with both the advertisement and the surrounding content. Additionally, advertisers select background music for an advertisement without considering the individualized preferences of users listening to the advertisement. Users that are nonplussed by an advertisement's background music are more likely to ignore an advertisement. Accordingly, background music in traditional advertisements does not effectively engage listeners.

SUMMARY

In one embodiment, a computer-implemented method for providing an audio advertisement with personalized background music comprises the following steps. A vocal advertisement received from an advertiser is selected for presentation to a user of a client device playing a stream of audio content. Content data describing audio content provided to the client device as part of the stream is obtained. Background music to accompany the vocal advertisement is selected based on the obtained content data, selection criteria received from the advertiser, user preferences, or a combination thereof. The selected background music and the selected vocal advertisement are provided to the client device, which is configured to play an audio advertisement comprising the background music played concurrently with the vocal advertisement.

In one embodiment, a system for providing an audio advertisement with personalized background music comprises a processor and a computer-readable storage medium comprising instructions executable by the processor. The instructions comprise instructions for performing the following steps. A vocal advertisement received from an advertiser is selected for presentation to a user of a client device playing a stream of audio content. Content data describing audio content provided to the client device as part of the stream is obtained. Background music to accompany the vocal advertisement is selected based on the obtained content data, selection criteria received from the advertiser, user preferences, or a combination thereof. The selected background music and the selected vocal advertisement are provided to the client device, which is configured to play an audio advertisement comprising the background music played concurrently with the vocal advertisement.

In one embodiment, a computer-readable storage medium comprises computer program instructions for providing an audio advertisement with personalized background music. The instructions are executable by a processor. The instructions comprise instructions for performing the following steps. A vocal advertisement received from an advertiser is selected for presentation to a user of a client device playing a stream of audio content. Content data describing audio content provided to the client device as part of the stream is obtained. Background music to accompany the vocal advertisement is selected based on the obtained content data, selection criteria received from the advertiser, user preferences, or a combination thereof. The selected background music and the selected vocal advertisement are provided to the client device, which is configured to play an audio advertisement comprising the background music played concurrently with the vocal advertisement.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
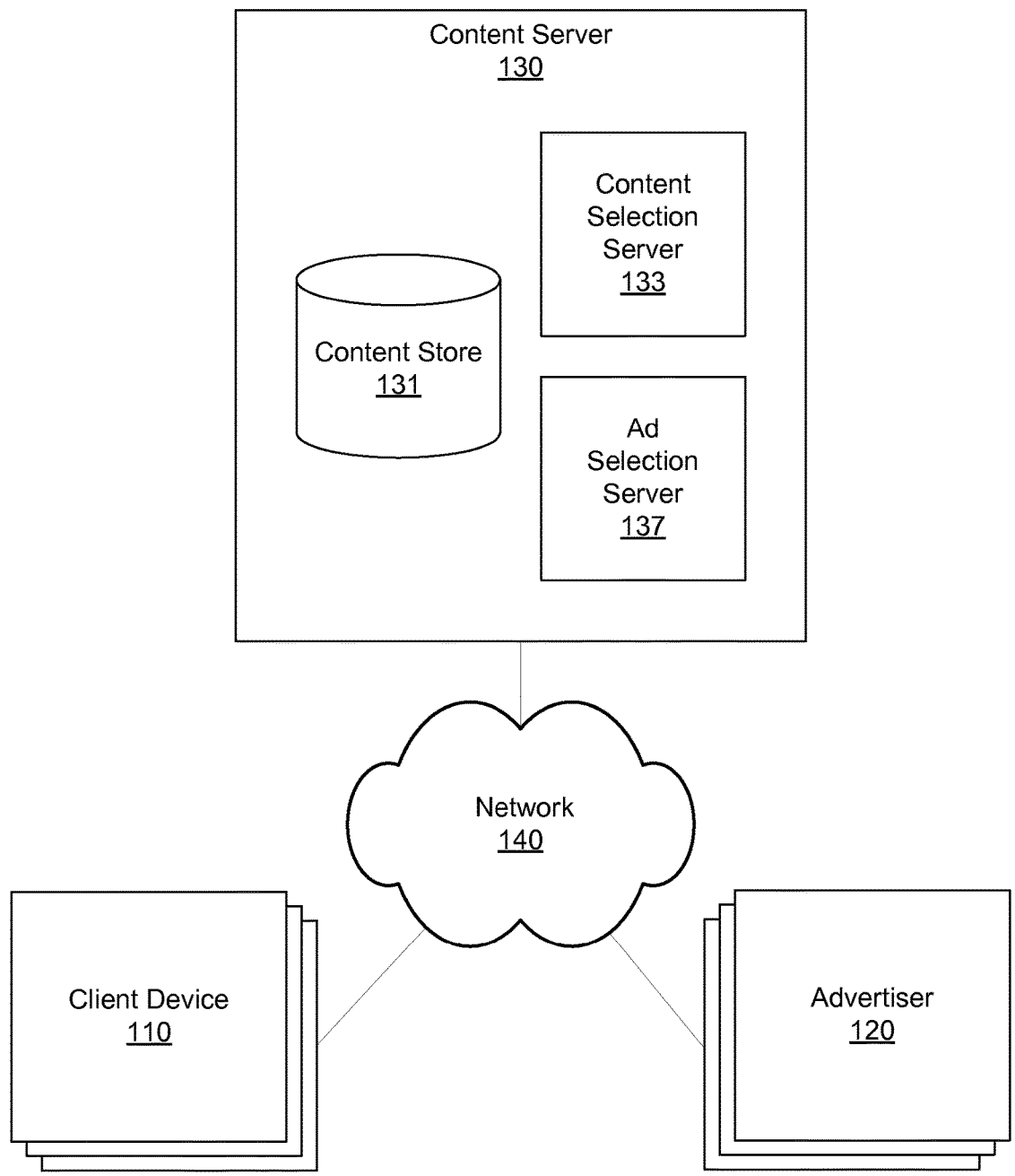
FIG. 1 illustrates a computing environment for generating personalized audio advertisements, according to an embodiment.

FIG. 1 illustrates a computing environment for generating personalized audio advertisements, according to an embodiment. The environment includes entities such as client devices 110, advertisers 120, and a content server 130.

The client devices 110 are computing devices such as smartphones with an operating system such as ANDROID or APPLE IOS, tablet computers, laptop computers, desktop computers, electronic stereos in automobiles or other vehicles, or any other type of network-enabled device that plays digital content. Typical client devices 110 include the hardware and software needed to input and output sound (e.g., speakers and microphone), connect to the network 140 (e.g., via Wi-Fi and/or 3G or other wireless telecommunication standards), or determine the client devices' current geographic location (e.g., using a Global Positioning System (GPS) unit).

The client devices 110 may have an application that allows interaction with the content server 130. For example, the application could be a browser that allows a user of the client device 110 to obtain content by browsing a web site of the content server 130. As another example, the application could be an application specifically designed (e.g., by the entity controlling the content server 130) to enable interactions with the content server 130 and its content. In addition to allowing a user to obtain content from the content server 130, the application may also provide the content server 130 with data about the status and use of the client device 110, such as its network identifier and geographic location. In some embodiments, the user of the application may elect to disable this feature.

The application on a particular client device 110 may be associated with a user of the client device 110 (e.g., via a one-time registration, or a username and password pair or other credentials). When the application is associated with a user, the application can store or otherwise gain access to user information such as user profile data (e.g., interests, demographics, content preferences, location). User information may be expressly provided through the application to configure a user profile on the content server 130. The client device 110 is described in further detail with respect to FIG. 2.

In general, the content server 130 provides audio content, such as songs, pieces of music, or audio recordings. In one embodiment, the content server 130 provides streamed audio content, but the content server 130 may alternatively or additionally provide other forms of media, such as videos, animations, movies, slideshows, images, or video games. Audio content refers to media having an audio component. In one particular embodiment referred to throughout the specification, the content server 130 provides streamed audio. Subsequent references to "playing," "listening," or other audio-related terminology could equally apply to (for example) a client device 110 presenting other media from the content server 130.

The content server 130 provides audio advertisements (also referred to as "audio ads"), which may be interspersed with, or incorporated into, non-advertisement audio content. An audio ad is a marketing communication delivered on behalf of an advertiser 120. An audio ad is composed of a vocal advertisement played concurrently with background music. For example, the content server 130 provides a stream of audio content including audio ads interspersed between songs. Alternatively or additionally, the content server 130 incorporates audio advertisements into animation, video, or game content.

Advertisers 120 are entities that provide the content server 130 with advertisement information used to produce audio advertisements played through client devices 110. As used herein, advertiser 120 refers to entities that create advertisements as well as to the systems used to communicate with the content system 130 (e.g., computers). Advertisement information provided by advertisers 120 includes a vocal advertisement, targeting criteria, music selection criteria, other advertisement preferences (e.g., budget, bid price), or a combination thereof. Vocal advertisements generally refer to audio files (e.g., spoken audio, sung audio, sound effects); however, advertisement information may include text to be converted to audio and combined with background music to produce an audio ad. Targeting criteria indicate characteristics of users to receive an advertisement. Music selection criteria indicate advertiser preferences for background music to be played with the vocal advertisement.

The content server 130 receives advertisement information from the advertisers 120. The content server 130 selects at least one vocal advertisement to provide to a client device 110 using the received advertisement information (e.g., targeting criterion, bid price). The content server 130 selects background music to accompany the selected vocal advertisement based on music selection criterion associated with the vocal advertisement, user preferences, audio content playing before or after the audio ad, or a combination thereof. The content server 130 combines the selected background music and the vocal advertisement to generate the audio advertisement for presentation through the client device 110. Dynamically matching vocal advertisements with background music beneficially improves user engagement by tailoring background music to a user's tastes and aural context.

The client devices 110, the advertisers 120, and the content server 130 are connected via a network 140. The network 140 may be any suitable communications network for data transmission. The network 140 uses standard communications technologies and/or protocols and can include the Internet. In another embodiment, the network 140 includes custom and/or dedicated data communications technologies.

Content Server

The components of the content server 130 include a content store 131, a content selection server 133, and an ad selection server 137. The components of the content server 130 are not necessarily implemented on any one device or group of co-located devices. For example, the content server 130 may include a content distribution network that supplies music from geographically dispersed content stores 131. Some components of the content server 130 may be controlled by a third-party entity; for example, the function of the ad selection server 137 is provided in whole or in part by an advertisement exchange.

The content store 131 stores audio content and associated metadata. Metadata about audio content includes bibliographic information (e.g., artist, composer, album title, track name, track number, release date, record label, genre) and associated audio features that characterize the associated audio content. An audio feature describes musicological characteristics of media items. For example, if the audio content is a song, the audio features of the song may indicate the underlying characteristics of the song, such as the gender of the singer, the type of background vocals, the tempo, the quality of the tones (e.g., pure or distorted), whether the melody dominates the composition, and presence of influence from another musical genre. A given unit of audio content may have many audio features, such as 100-500 audio features. In one embodiment, the mapping of audio content to audio features is established using the MUSIC GENOME PROJECT database created by PANDORA MEDIA, INC. of Oakland, Calif.

The ad selection server 137 selects vocal advertisements for presentation to a user of a client device 110 receiving audio content. In one embodiment, the application on the client device 110 is configured to request advertisements between items of audio content. The application queries the ad selection server 137, which selects a vocal advertisement. The client device 110 plays the vocal advertisement concurrently with background music selected by the music selection server 133. The vocal advertisement may be an advertisement with pre-recorded audio received from an advertiser 120, or an audio version of text. The ad selection server 137 may also select non-audio advertisements to deliver to the client device 110 (e.g., interactive visual content, animations, images). The ad selection server 137 is described in further detail with respect to FIG. 3.

The content selection server 133 provides audio content to a requesting client device 110. If the content server 130 provides streaming audio, for example, then the content selection server 133 selects audio content and streams the selected audio to the client device 110 over time. The content selection server 133 may select audio content for a user based at least in part on user information (e.g., user preferences), user requests, or a combination thereof. The content selection server 133 also selects background music to accompany a vocal advertisement in an audio ad. The background music is selected based at least in part on music selection criteria associated with the vocal advertisement and user information (e.g., user preferences, content played before or after the audio ad).

In one embodiment, the content selection server 133 generates content playlists and selects audio content from the content playlists based on a seed value received from a user. A seed value describes one or more aspects of the content playlist that the user would like formed. Seed values may specify bibliographic information of audio content (e.g., track title, band name, album title, release year) or any term to describe music (e.g., musical genre, historical era, an audio feature). The content selection server 133 extracts audio features from the seed value using a mapping between audio content associated with the seed value and corresponding media features in the content store 131. If the seed value does not describe a single item of audio content, the content selection server 133 retrieves one or more items audio content associated with the seed value. For example, the content selection server 133 retrieves one or more representative songs (e.g., of a genre, of a band). The content selection server 133 uses the extracted audio features to dynamically generate a content playlist of audio content having audio features similar to the extracted audio features. For example, given a seed value of a band X, the content selection server 133 locates a song Y by band X and identifies audio features that characterize the song Y. The content selection server 133 is described in further detail in conjunction with FIG. 4.

Client Device

Figure 2:
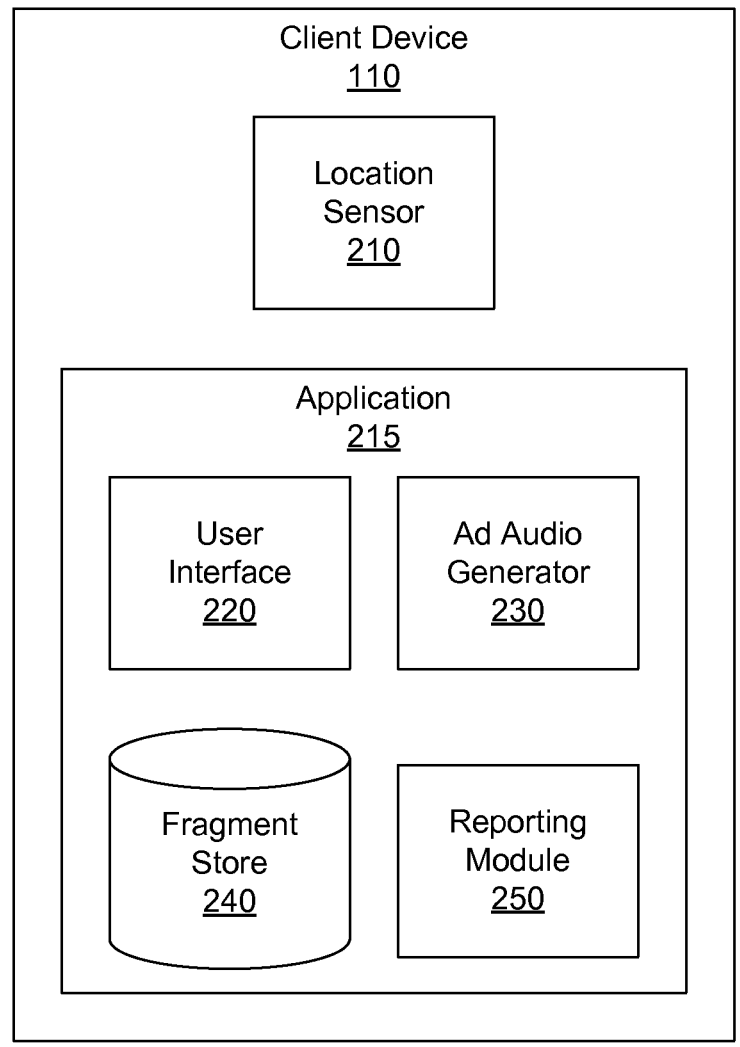
FIG. 2 is a high-level block diagram illustrating a detailed view of a client device, according to an embodiment.

FIG. 2 is a high-level block diagram illustrating a detailed view of a client device 110, according to an embodiment. The client 110 includes a location sensor 210 and an application 215. The application 215 includes a user interface 220, an optional ad audio generator 230, a fragment store 240, and a reporting module 250.

The location sensor 210 determines a particular geographic location of the client device 110, such as coordinates provided by a Global Positioning System (GPS) sensor. The location sensor 210 may infer location from data collected from network infrastructure. For example, location is determined from cell tower triangulation or a geographical location associated with a nearby device's media access control (MAC) address (e.g., a Wi-Fi router's MAC address). In one embodiment, the application 215 periodically accesses the location sensor 210 (or a recently cached location reading) and transmits the location to the content server 130. Alternatively or additionally, the content server 130 infers the client device's location from network routing information (e.g., from an Internet Protocol address associated with the client device 110). The user may disable location readings using one or more settings on the application 215 or an operating system of the client 110.

The user interface 220 facilitates interaction between the user and the content server 130. For example, the application 215 provides a graphical user interface for interacting with an audio stream. An example user interface 220 displays bibliographic information about a currently playing or previously played song and may also include an image advertisement selected by the ad selection server 137. The user interface 220 may also provide playback controls (e.g., pause, skip, play) and feedback controls (e.g., like, dislike, favorite, rate, share, bookmark) to indicate the user's positive, negative, or indifferent reaction to a song. In one embodiment, a user may request a playlist through the user interface 220 by providing a seed value used by the content selection server 133 to generate a content playlist.

The ad audio generator 230 combines background music with a vocal advertisement to generate an audio ad. In one embodiment, the background music and the vocal advertisement provided to the client device 110 have a same temporal duration. Alternatively or additionally, the content selection server 133 provides synchronization information (e.g., a start time within the background music) to ensure intended playback of the vocal advertisement and the background music. The ad audio generator 230 may modify the audio ad to produce a finished audio ad by applying acoustic effects or incorporating sound effects. For example, the ad audio generator 230 provides fade-in or fade-out effects so that the audio ad blends with temporally adjacent audio content. Temporally adjacent audio content refers to audio content ending immediately before the audio ad or to audio content beginning immediately before the audio ad.

The fragment store 240 stores audio content received from the audio server 130 to be played by the content device 110. In one embodiment, the content server 130 provides content fragments comprising a number of audio content items (e.g., four songs). The content selection server 133 may select related audio content for use in a single content fragment. For example, a content fragment contains songs having similar audio features, so the user experiences smoother transitions between songs. Additionally, a content fragment beneficially prevents interruption of playback due to momentary lapses of connectivity. Content fragments may include slots for advertisements (e.g., zero to two slots). A slot for an advertisement provides instructions for retrieving one or more audio advertisements from the content server 130 for playback through the client device 110. Alternatively or additionally, the stored content fragment includes the content of one or more audio advertisements.

The reporting module 250 transmits usage data to the content server 130. Usage data includes feedback received through the user interface 220. Feedback include explicit feedback (from a dedicated feedback in the user interface 220) or implicit (e.g., skipping a song, sharing a song). Usage data also includes a geographic location from the location sensor 210. The content server 130 generates and selects advertisements based at least in part on the transmitted usage data.

Ad Selection Server

Figure 3:
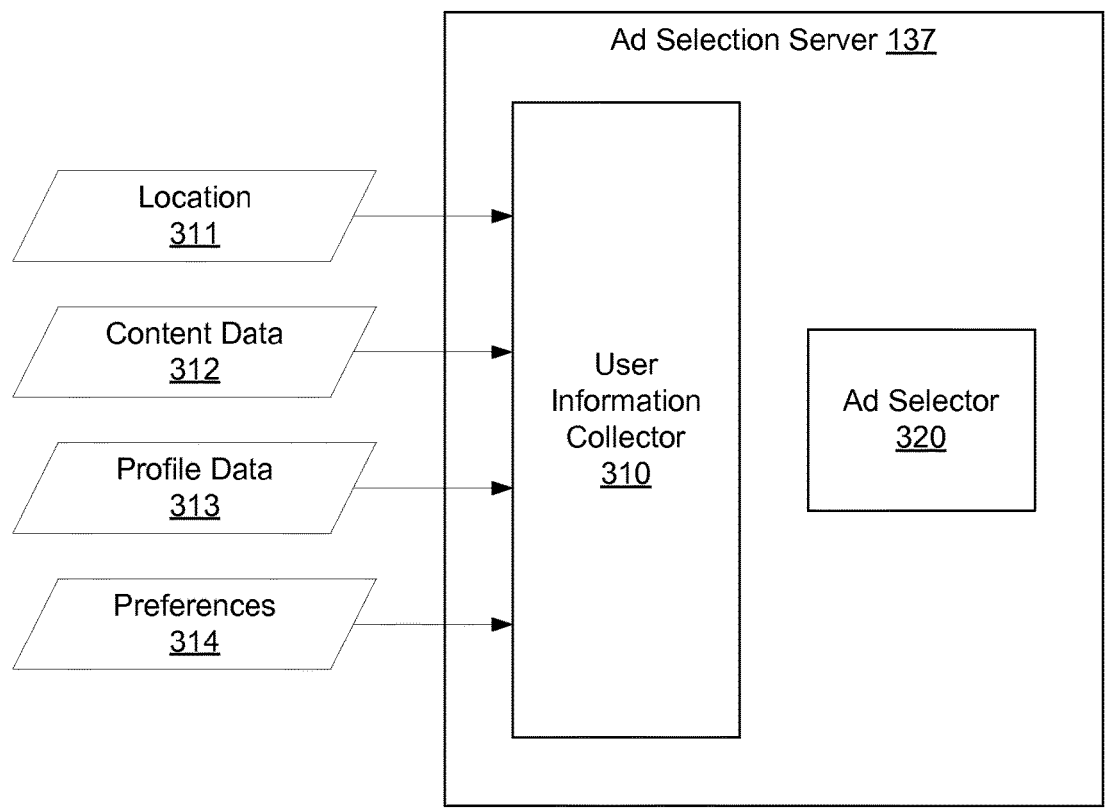
FIG. 3 is a high-level block diagram illustrating a detailed view of an ad selection server, according to an embodiment.

FIG. 3 is a high-level block diagram illustrating a detailed view of ad selection server 137, according to an embodiment. The ad selection server 137 includes a user information collector 310 and an ad selector 320. Some embodiments of the ad selection server 137 have different modules than those described here or may distribute functions in a different manner than that described here.

The user information collector 310 retrieves user data received or otherwise obtained by the content server 130. The user data is used to select vocal advertisements. In one embodiment, the user information collector 310 retrieves user information such as location data 311, content data 312, profile data 313, and preference data 314.

Location data 311 describes a location associated with the user or with the client device 110. Location data 311 includes relatively precise data such as geographic coordinates (e.g., from the reporting module 250) or an address (e.g., a past or present residential address or billing address from the user's user profile). Location data 311 also includes less precise data indicating a general geographic region (e.g., postal code, municipal area, city, town, neighborhood, country, state, county).

Content data 312 describes content provided to a client device 110 associated with a user. Content data 312 include historical content as well as content currently playing on the client device 110 (e.g., obtained from the reporting module 250, inferred based on the content fragment transmitted to the client device 110). The user information collector 310 may determine content data 312 describing what audio content a user is currently listening to or temporally adjacent content to after an advertisement) based on audio content provided to the client 110 and other feedback from the reporting module 250. Content data 312 includes both bibliographic information (i.e., information used to catalogue audio content such as artist, album, producer, release date) and audio features of the audio content.

Profile data 313 includes data explicitly provided by a user and otherwise obtained about the user. For example, the user information text is the user's name or inferred social role (e.g., father, grandmother, student, worker, tycoon). Such profile data 313 includes a user's preferred language, which the ad selector 320 uses to select a vocal advertisement in the user's language. In addition, the profile data 313 may include demographics (e.g., age, gender, socioeconomic status, education) and interests (e.g., politics, leisure activities, hobbies), or other user information included in advertiser targeting criteria.

The preference data 314 includes content preferences as well as advertisement preferences. Content preferences refer to user inclinations towards audio content and may be quantified with respect to a particular item of bibliographic information about audio content (e.g., track title, artist, album, genre) or audio features (e.g., from the MUSIC GENOME PROJECT database). Advertisements preferences may be quantified with respect to a particular product, a particular brand, a particular advertisement, or a particular component of an advertisement (e.g., the voice, the background music).

Content preferences may be received from the user (e.g., as part of a user profile) or inferred from user activity including explicit feedback (from feedback buttons on the user interface 220), implicit feedback (e.g., shares, skips), and logged user activity (e.g., songs provided through the content server 130). For example, if a user provides positive feedback toward audio content (e.g., listening to the entirety of a song), then the user's preference data 314 is modified to indicate a greater inclination to the audio content's audio features and bibliographic information. As another example, if a user provides positive feedback to an audio ad (e.g., selects a visual advertisement accompanying the audio ad) that includes background music, then the user's preference data 314 is updated to indicate a greater inclination toward the subject of the audio ad and the background music for the audio ad.

The ad selector 320 receives vocal advertisements and selects one or more of the vocal advertisements to provide to the client device 110. In one embodiment, the ad selector 320 determines scores between the user and the vocal advertisements, ranks the vocal advertisements by the scores, and selects a vocal advertisement according to the ranking (e.g., the highest ranking). The ad selector 320 may determine the score from a weighted linear combination, for example, where each term depends on a match between a characteristic of the vocal advertisement and user data indicating a positive or negative inclination toward the characteristic. The weighting of different terms depends on the advertisement characteristic's importance to the advertiser 120 or usefulness for predicting the advertisement's effectiveness.

Scoring an advertisement depends at least in part on a match between targeting criteria and the user's user information. For example, the ad selector 320 compares a user's location data 311, demographics (from the profile data 313), and interests (from the profile data 313) with corresponding user characteristics indicated by targeting criteria. The targeting criteria could be specific to the advertiser 120, specific to the vocal advertisement, or a combination thereof. The ad selector 320 may also determine the score based at least in part on the preference data 314, particularly advertisement preferences. The ad selector 320 modifies the score based on a user's like or dislike of advertisement characteristics present in the vocal advertisement. For example, if a user has repeatedly given negative feedback about dog food advertisements, then the ad selector 320 decreases the score of a vocal advertisement for dog food. The ad selector 320 may also modify a vocal advertisement's score based on content data 312 (e.g., audio content played before or after the advertisement). In particular, if there is a match between content of the vocal advertisement and bibliographic information about audio content adjoining the ad, then the ad selector 320 increases the score. For example, if a vocal advertisement describes an upcoming concert, and if a song played temporally adjacent to the audio ad is by the band playing the concert, then the ad selector 320 increases the score of the vocal advertisement. Accordingly, the ad selector 320 outputs one or more vocal advertisement to be played on a user's client device 110.

Music Selection Server

Figure 4:
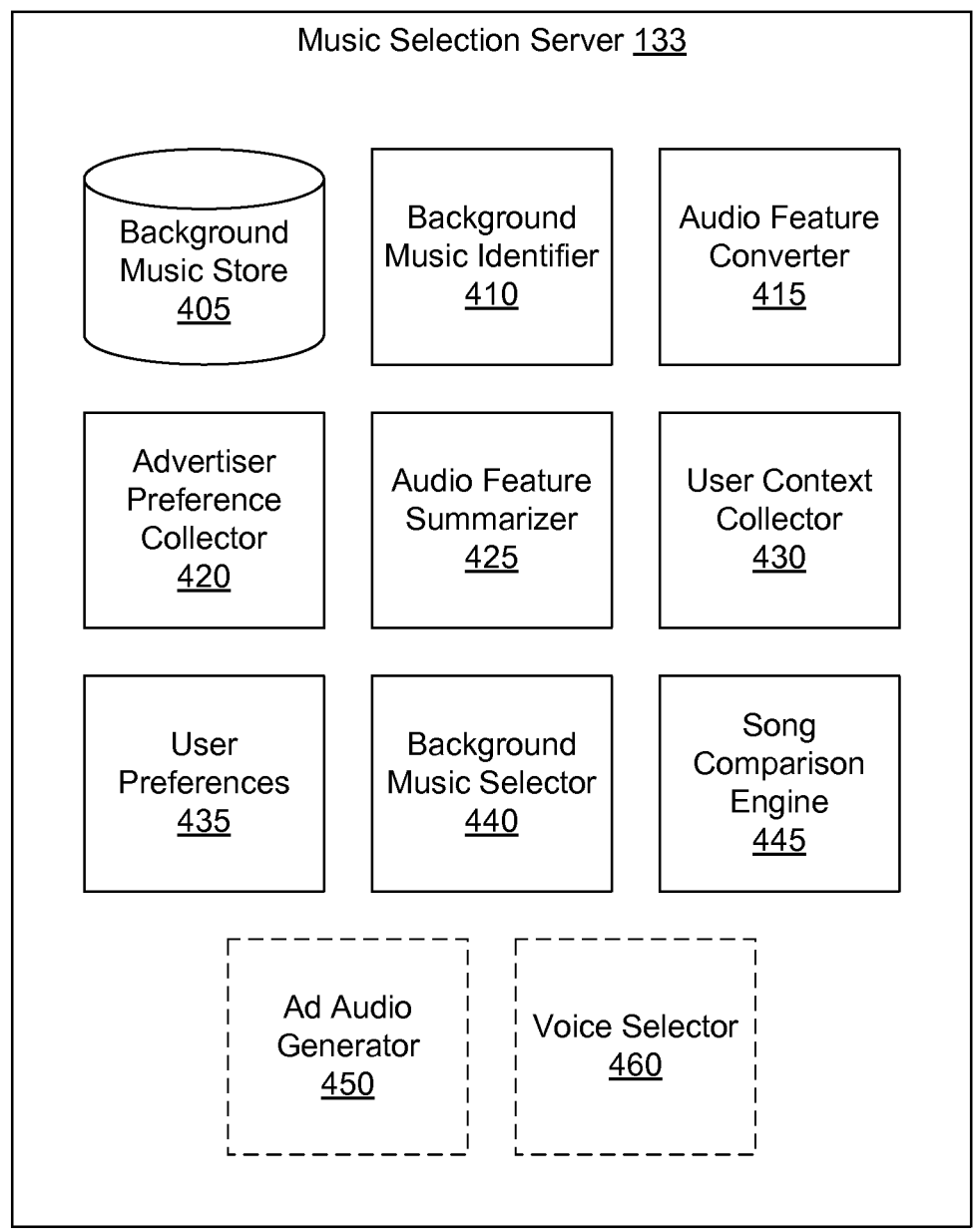
FIG. 4 is a high-level block diagram illustrating a detailed view of a music selection server, according to an embodiment.

FIG. 4 is a high-level block diagram illustrating a detailed view of a music selection server 133, according to an embodiment. The music selection server 133 includes a background music store 405, a background music identifier 410, an audio feature converter 415, an advertiser preference collector 420, an audio feature summarizer 425, a user context collector 430, a user preferences module 435, a background music selector 440, a song comparison engine 445, an optional ad audio generator 450, and an optional voice selector 460. Some embodiments of the music selection server 133 have different modules than those described here or may distribute functions in a different manner than that described here.

The background music store 405 stores audio content suitable for use as background music. Typically, background music is a portion of a song, but background music also includes ambient noise (e.g., ocean waves, white noise, jungle sounds). The background music store 405 may include the portions of the audio content, or pointers to portions of audio content. For example, the pointer is an address of the audio content in the content store 131, as well as a start time and an end time of the portion of the audio content suitable for use as background music. In some embodiments, the background music store 405 includes a list of audio content eligible for use as background music. For example, the list includes songs owned by entities that have agreed on a royalty rate for using their songs as background music. As another example, the list excludes songs having crowd noise because they were recorded at a live performance.

The background music identifier 410 identifies portions of audio content for use as background music. The identified portions of the audio content (or pointers thereto) may be stored in the background music store 405 or provided to the background music selector 440. In one embodiment, the background music identifier 410 identifies portions of songs fulfilling criteria to ensure that the portion is suitable for use as background music. One example criterion verifies that the portion does not have vocal content (e.g., sung, spoken, or rapped lyrics). Another example criterion excludes portions of songs that are discordant based on presence of atonality, distortion, or harmonically discordant chords.

In one embodiment, the background music identifier 410 generates portions of audio content suitable for use as background music. The background music identifier 410 takes as input audio content having both vocal and non-vocal components. For example, a song has multiple channels or tracks, some of which correspond to vocal content and some of which correspond to non-vocal content (e.g., instrumental music). The background music identifier 410 identifies the non-vocal components of the audio content and generates background music from the non-vocal components without the vocal components.

The audio feature converter 415 takes audio content as input and outputs a coordinate representing audio features present in the song. The audio feature converter 415 obtains audio features present in the audio content using the mapping between audio content and audio features from the content store 131 (e.g., the MUSIC GENOME PROJECT database). The coordinate quantifies the audio features present in audio content to facilitate comparisons to other audio content. Alternatively or additionally, the audio feature converter 415 determines a vector or other symbolic representation of audio features in audio content. Entries of the coordinate correspond to different audio features. For example, the audio feature converter 415 receives an item of candidate background music and determines a candidate coordinate that represents audio features of the candidate background music. The candidate coordinate representing the audio features of the candidate background music is used by the background music selector 440 to select background music from among the candidate background music to accompany a vocal advertisement. The audio feature converter 415 is also used to generate reference coordinates summarizing background music selection criteria, user preferences, or audio content played before or after the audio ad.

The advertiser preference collector 420 takes as input a vocal advertisement and identifies reference audio content based on selection criteria associated with the vocal advertisement. The advertiser preference collector 420 retrieves selection criteria received from an advertiser 120 and associated with the vocal advertisement. Selection criteria may be specific to the vocal advertisement (e.g., included in the advertisement information comprising the vocal advertisement) or may specified by the advertiser 120 for multiple vocal advertisements. The selection criteria may specify bibliographic information, a seed value, audio features, or a combination thereof. If the selection criteria include bibliographic information (e.g., song, artist, album), the advertiser preference collector 420 identifies reference audio content that has bibliographic information matching the bibliographic information given in the selection criteria. For example, a vocal advertisement about a Hawaiian hotel is associated with selection criteria indicating a ukulele player (the bibliographic information). In this example, the advertiser preference collector 420 identifies reference audio content from the ukulele player's songs. If the selection criteria include a seed value, then the advertiser preference collector 420 identifies reference audio content from the content playlist corresponding to the seed value. For example, a vocal advertisement about a potent Scottish beverage is associated with selection criteria specifying a "Scotland the Brave" seed value. In this example, the advertiser preference collector 420 identifies reference audio content from songs in the content playlist generated from the "Scotland the Brave" seed value. The reference songs are used to identify a reference coordinate summarizing the selection criteria.

The audio feature summarizer 425 receives one or more songs and determines a reference coordinate representing audio features that summarize the one or more songs. The audio feature summarizer 425 determines coordinates representing audio features of the one or more songs using the audio feature converter 415. From the coordinates representing the audio features of the input songs, the audio feature summarizer 425 determines a reference coordinate. In one embodiment, the audio feature summarizer 425 determines the reference coordinate by applying a measure of central tendency (e.g., an average) to the coordinates derived from the input songs. The audio feature summarizer 425 may receive reference audio content output by the advertiser preference collector 420 (e.g., songs by a particular audience, songs in a content playlist) and determine a reference coordinate representing the reference audio content. The reference coordinate is used by the background music selector 440 to select background music similar to the reference audio content.

Alternatively or additionally to receiving songs, the audio feature summarizer 425 takes as input audio features specified by an advertisement's selection criteria. The audio feature summarizer 425 determines a reference coordinate used to select background music with audio features similar to the audio features specified by the advertisement's selection criteria. For example, a vocal advertisement about penny-farthing bicycles is associated with selection criteria indicating that the background music should have audio features such as acoustic guitar, mellow vocals, and rhythmic clapping. In this example, the reference coordinate includes entries representing the advertiser's preferred audio features.

The user context collector 430 receives content data 312 and determines a reference coordinate that represents audio features of audio content described by the content data 312. The content data 312 may indicate audio content (e.g., temporally adjacent audio content), a seed value for a content playlist, or a combination thereof. When the content data 312 describe audio content, the user context collector 430 uses the audio content as reference audio content. When the content data 312 indicate a seed value, the user context collector 430 identifies reference audio content from the content playlist corresponding to the seed value. The user context collector 430 uses the audio feature summarizer 425 to determine a reference coordinate representing audio features of the reference audio content. For example, the reference coordinate represents a blend of audio features in the songs played immediately before and immediately after the vocal advertisement. The reference coordinate may be used by the background music selector 440 to select background music similar to the reference audio content identified from the content data 312.

The user preferences module 435 receives preference data 314 and determines a reference coordinate that represents audio features of audio content that the user likes. The user preferences module 435 identifies audio features of audio content that the user has given positive feedback. The audio features are converted to a reference coordinate by the audio feature converter 415. The reference coordinate may be used by the background music selector 440 to select background music having audio features similar to audio features that the user enjoys. For example, if a user frequently listens to music with prominent drum solos, then the reference coordinate includes an entry corresponding to a "drum solos" audio feature.

The background music selector 440 selects background music from the identified background music items to accompany a vocal advertisement. In one embodiment, the background music selector 440 obtains reference coordinates corresponding to selection criteria, content data 312, preferences 314, or a combination thereof. If more than one reference coordinate is obtained, the background music selector 440 combines the reference coordinates to determine a combined reference coordinate. In one embodiment, the selection criteria include relative weights for combining reference coordinates in a linear combination. The relative weights may be used to combine reference coordinates derived from the selection criteria, the content data 312, or the user preferences 314. Alternatively or additionally, the relative weights may be used to combine reference coordinates corresponding to different selection criteria (e.g., weighting of songs identified from bibliographic information vs. songs identified by a seed value). The background music selector 440 compares the combined reference coordinate to candidate coordinates corresponding to the candidate background music. The background music is selected from the candidate background music responsive to the comparison between the combined reference coordinate and the candidate coordinate. In one embodiment, the background music selector 440 uses a measure of similarity determined by the song comparison engine 445 and selects the background music from a ranking of the candidate background music by the measure of similarity.

The song comparison engine 445 takes as input a candidate coordinate and a reference coordinate and outputs a measure of similarity between the candidate coordinate and the reference coordinate. The measure of similarity indicates similarity between the corresponding candidate background music item and the one or more corresponding reference audio items. In one embodiment, the measure of similarity is based on a distance between the candidate coordinate and the reference coordinate. For example, the distance is a Euclidean distance (L2 norm) or a Manhattan distance (L1 norm) between the candidate coordinate and the reference coordinate. As the distance increases, the measure of similarity decreases. For example, two songs with many matching audio features have a low distance between their corresponding coordinates and accordingly have a high measure of similarity. In an alternative embodiment, the candidate coordinate and the reference coordinate are instead vector representations of audio features. An example measure of similarity in this alternative embodiment is the cosine similarity between the two vector representations of audio features.

In one embodiment, the song comparison engine 445 ignores a subset of audio features in the reference coordinate and the candidate coordinate. To ignore audio features, the song comparison engine 445 omits contributions from the ignored subset of audio feature from the distance calculation. For example, the song comparison engine 445 omits audio features corresponding to vocal characteristics of audio content, which beneficially reduces processing when selecting from candidate background music items that do not have vocals.

In one embodiment, the music selection server 133 selects background music for use with a particular user and a particular vocal advertisement. Alternatively or additionally, the music selection server 133 selects background music to accompany a particular vocal advertisement and delivers the resulting audio ad to all users or a subset of users. Alternatively or additionally, the music selection server 133 selects background music for a user (or group of users) without consideration of the vocal advertisement in the audio ad.

In some embodiments the vocal advertisement is text. Accordingly, the ad audio generator 450 uses a text-to-speech (TTS) algorithm to convert the text into audio for combination with the background music into an audio ad. In one embodiment, the ad audio generator 450 generates the audio advertisement based on vocal parameters, which affect the audio output synthesized by the TTS algorithm. Vocal parameters may specify a prepackaged voice (e.g., male or female, a British voice, an upcountry Carolina voice, a silky voice, a gravelly voice) or may indicate more nuanced variables that control how the TTS algorithm synthesizes audio. Example vocal parameters include register, tone, or emotion of the spoken audio produced by the ad audio generator 450.

The ad audio generator 450 may be implemented on the content server 130, on an external server, or on the client device 110 (e.g., through an operating system of the client 110, through the application 215). If implemented on a server, the TTS algorithm may use more computationally expensive TTS methods, which beneficially provide more natural spoken audio. On the other hand, a client-based TTS algorithm reduces network bandwidth usage because a text version of the vocal advertisement contains less data than an audio version.

The music voice selector 460 selects a voice to generate an audio version of the vocal advertisement. In one embodiment, the voice selector 460 determines vocal parameters for use in a TTS algorithm to create an audio version of the vocal advertisement. The vocal parameters may be determined based on content of the vocal advertisement, user information gathered by the user information collector 310, and the selected background music to accompany the vocal advertisement.

In one embodiment, the voice selector 460 determines vocal parameters based on a mapping between audio content and vocal parameters. The voice selector 460 identifies audio content associated with a vocal advertisement. The audio content associated with the vocal advertisement includes background music selected to accompany the vocal advertisement, candidate background music, or reference music from the selection criteria or the content data 312. The voice selector 460 then obtains a correspondence between different vocal parameters and audio features of the identified audio content. For example, vocal parameters such as pitch, frequency content, emotion, and speed correspond to audio features such as register, timbre, emotional tone, and tempo. In particular, the voice selector 460 uses audio features describing vocalists in the identified audio content to determine vocal parameters. Using the correspondence, the voice selector 460 outputs the vocal parameters determined from the correspondence between the audio features and the vocal parameters.

Providing a Personalized Audio Advertisement

Figure 5:
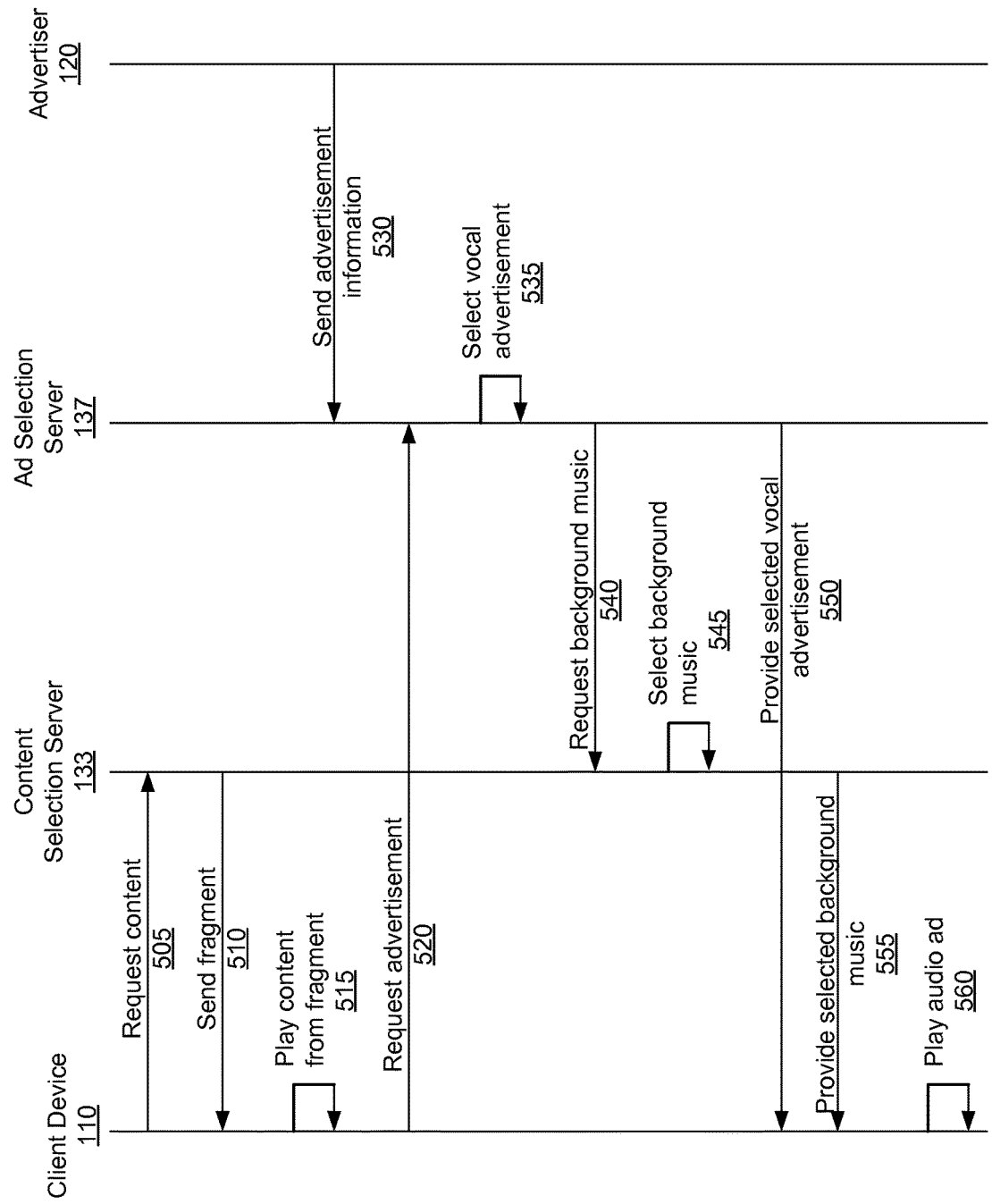
FIG. 5 is a sequence diagram illustrating interactions between the client device and the content server, according to an embodiment.

FIG. 5 is a sequence diagram illustrating interactions between the client device 110 and the content server 130, according to an embodiment. The client device 110 requests 505 content (e.g., to initiate a streaming session, in response to having less than a threshold amount of audio content stored in the fragment store 240). The content selection server 133 selects audio content and sends 510 a fragment comprising an ad creative placed between two items of selected audio content. An ad creative comprises executable instructions prompting the client device 110 to request 520 an advertisement.

After playing 515 an initial item of audio content, and prior to playing a next item of content, the client device 110 executes the ad creative. For example, the ad creative includes a pointer (e.g., a Uniform Resource Locator) to the ad selection server 137 and a JavaScript command instructing the client device 110 to request 520 an advertisement using the pointer to the ad selection server 137. By executing the ad creative, the client device 110 requests 520 an advertisement.

An advertiser 120 sends 530 advertisement information (e.g., a vocal advertisement, targeting criteria, selection criteria) to the content server 130. The ad selection server 137 selects 535 a vocal advertisement for presentation through the client device 110. The ad selection server 137 requests 540 background music to accompany the vocal advertisement from the content selection server 133. The content selection server 133 selects 545 background music to accompany the vocal advertisement in response to the request 540.

The ad selection server 137 provides 550 the selected vocal advertisement to the client device 110, and the content selection server 133 provides 555 the selected background music to the client device 110. The client device 110 plays 560 the audio ad comprising the vocal advertisement played concurrently with the selected background music. The client device 110 combines the vocal advertisement with selected background music. Alternatively or additionally, the content server 130 generates the audio ad and provides the audio ad to the client device 110, which plays 560 the audio ad.

Advertisement Generation

Figure 6:
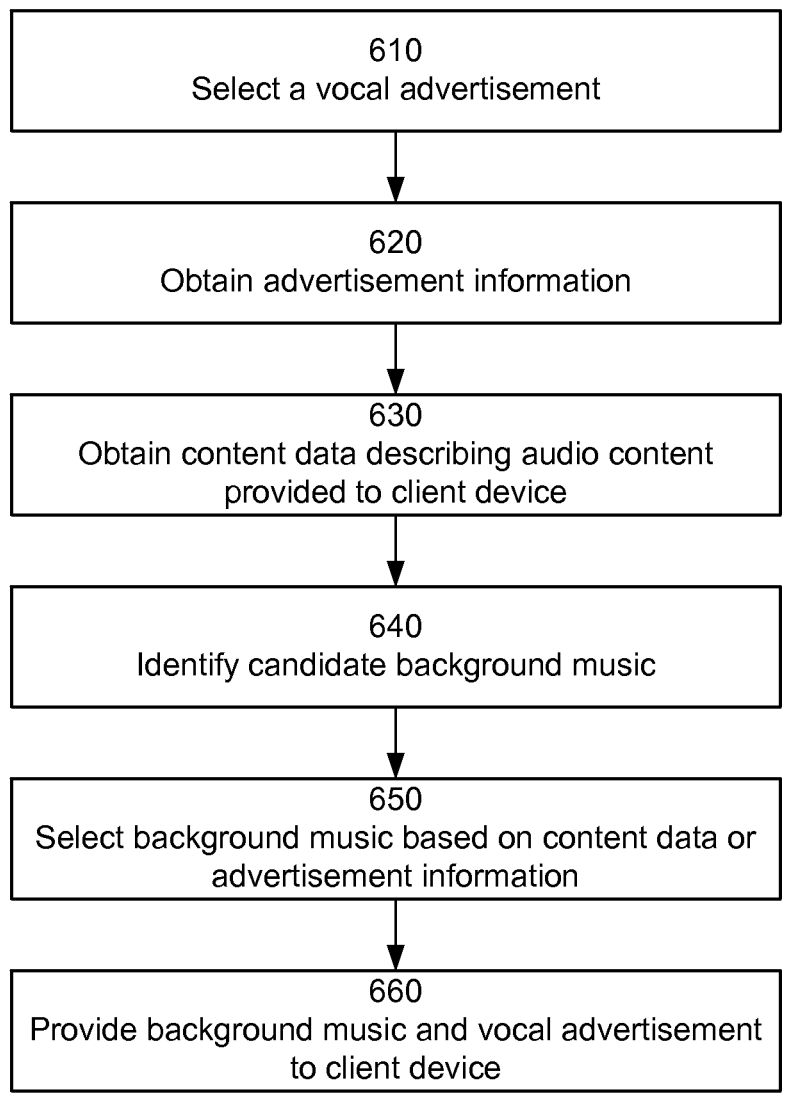
FIG. 6 is a flowchart illustrating an example process for providing an audio advertisement with personalized background music to a client device, according to an embodiment.

FIG. 6 is a flowchart illustrating an example process for providing an audio advertisement with personalized background music to a client device 110, according to an embodiment. Other entities may perform some or all of the steps of the process in other embodiments. Likewise, embodiments may include different and/or additional steps, or perform the steps in different orders.

The content server 130 (e.g., the ad selector 320) selects 610 a vocal advertisement for presentation to a user of a client device 110 playing a stream of audio content. The vocal advertisement is associated with selection criteria, targeting criteria, and other advertisement information received from an advertiser 120. The vocal advertisement may be selected in response to a request from a client device 110 for an advertisement to be played as part of a stream of audio content.

The content server 130 (e.g., the advertiser preference collector 420) obtains 620 advertisement information associated with the selected vocal advertisement. The advertisement information may include the vocal advertisement, selection criteria for background music, targeting criteria, or other metadata related to the vocal advertisement. For example, the selection criteria indicate bibliographic information about songs to be used as reference music for selecting candidate background music.

The content server 130 (e.g., the audio feature summarizer 425) obtains 630 content data describing audio content provided to the client device 110 as part of the stream of audio content. For example, the content data describes audio content temporally adjacent to the audio ad. Audio content temporally adjacent to the audio ad refers to audio content played immediately before or immediately after the audio ad. As another example, the content data describes audio content from a content playlist. The audio content described by the content data may be used as reference music for selecting candidate background music.

The content server 130 (e.g., the background music identifier 410) identifies 640 candidate background music items, where a candidate background music item includes a portion of audio content. For example, the content server 130 identifies 640 candidate background music items from one or more portions of songs without vocal content. The identified portions have temporal durations greater than or equal to a temporal duration of the audio advertisement. As another example, the content server 130 obtains songs having vocal content and non-vocal content. The content server 130 then generates the candidate background music items from the non-vocal content of the songs. As a third example, the content server 130 identifies the candidate background music items from audio content matching selection criteria (e.g., bibliographic information, a seed value, audio features) associated with the audio advertisement.

The content server 130 (e.g., the background music selector 440) selects 650 background music to accompany the vocal advertisement based at least in part on the obtained content data. In one embodiment, the content server 130 identifies reference music from the audio content described by the content data or audio content described by the selection criteria. The content server 130 selects the background music from the candidate background music items based on comparisons between the reference music and the candidate background music items. Alternatively or additionally, the content server 130 compares coordinates representing audio features of candidate background music and the reference music. The content server 130 obtains a candidate coordinate that represents audio features of the candidate background music item and obtains one or more reference coordinates representing audio features of the reference music. The content server 130 then determines a score for the candidate background music item by determining a measure of similarity between the candidate coordinate and the one or more reference coordinates. The content server 130 then selects a candidate background music item as the background music responsive to the score for the candidate background music item. For example, the selected candidate background music item has a highest score.

The content server 130 provides 660 the client device 110 with the selected background music and the selected vocal advertisement. The client device 110 is configured to play an audio ad comprising the background music played concurrently with the vocal advertisement. The content server 130 or the client device 110 may combine the background music and the vocal advertisement into the audio ad. If the vocal advertisement is text, the content server 130 (e.g., the voice selector 460) may select a voice for a TTS algorithm to generate an audio version. The voice is selected based at least in part on audio features of the selected background music, audio content described by the content data, user preferences, or other user information. The content server 130 causes the audio advertisement to play on the client device 110, where the audio advertisement includes the selected background music and the vocal advertisement, which may be generated by the TTS algorithm using the selected voice.

Computer

Figure 7:
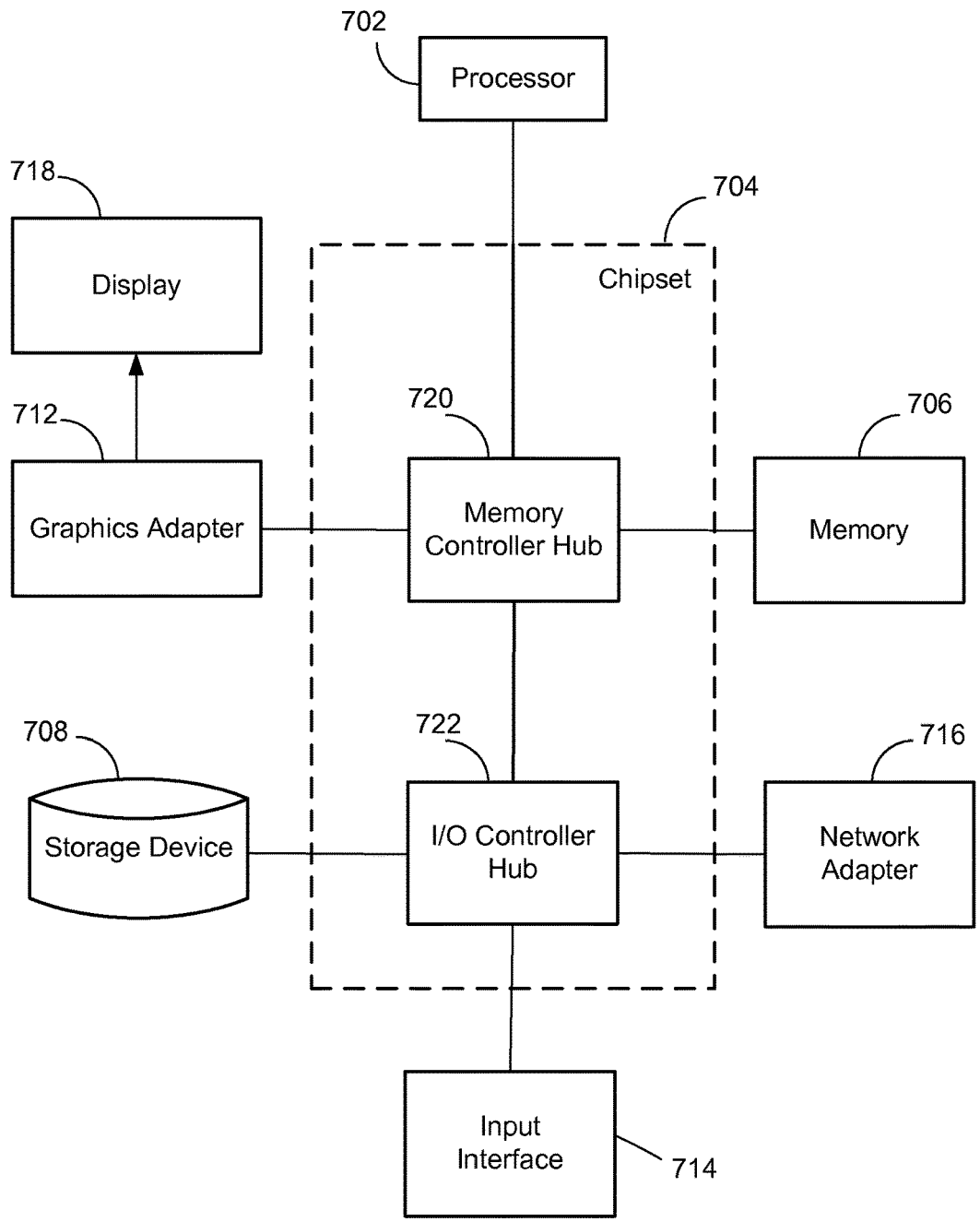
FIG. 7 is a high-level block diagram illustrating an example computer for implementing the entities shown in FIG. 1, according to an embodiment.

FIG. 7 is a high-level block diagram illustrating an example computer 700 for implementing the entities shown in FIG. 1, according to an embodiment. The computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, an input interface 714, a network adapter 716, and an audio output device 724 are coupled to the I/O controller hub 722. Other embodiments of the computer 700 have different architectures.

The storage device 708 is a non-transitory computer-readable storage medium such as a hard drive, compact disk read-only memory (CD-ROM), DVD, or a solid-state memory device. The memory 706 holds instructions and data used by the processor 702. The input interface 714 is a touch-screen interface, a mouse, track ball, or other type of pointing device, a keyboard, or some combination thereof, and is used to input data into the computer 700. In some embodiments, the computer 700 may be configured to receive input (e.g., commands) from the input interface 714 via gestures from the user. The graphics adapter 712 displays images and other information (e.g., the user interface 220) on the display 718. The network adapter 716 couples the computer 700 to one or more computer networks 140. In one embodiment, the display 718 and input interface 714 are combined as a touch-sensitive display (e.g., a touch screen), which detects gestures (e.g., scrolling, tapping, swiping, pinching, stretching). The audio output device 724 produces audible sound waves from electrical signals. The audio output device includes hardware to convert electrical signals to mechanical vibrations (e.g., a piezoelectric speaker, a dynamic loudspeaker) as well as accompanying electronic circuitry (e.g., an amplifier, a digital-to-analog converter).

The computer 700 is adapted to execute computer program modules for providing functionality described herein. As used herein, the term "module" refers to computer program logic used to provide the specified functionality. Thus, a module can be implemented in hardware, firmware, software, and/or a combination thereof. In one embodiment, program modules (e.g., the ad selector 320, the background music selector 440) are stored on the storage device 708, loaded into the memory 706, and executed by the processor 702.

The types of computers 700 used to implement the entities of FIG. 1 can vary depending upon the embodiment and the processing power required by the entity. For example, the client device 110 is a computer 700 such as a smart phone or a tablet. As another example, the content server 130 is one or more servers working together to provide the functionality described herein. A computer 700 (e.g., a server) may lack some of the components described above, such as a keyboard, a graphics adapter 712, and a display 718. Alternatively or additionally, the functionality of a computer 700 may be provided by multiple communicatively coupled devices. For example, the client device 110 is a tablet including many of the components of the computer 700 (e.g., the network adapter 716, the chipset 704, the processor 702) communicatively coupled with external audio output device 724 (e.g., a home sound system comprising multiple speakers).

Additional Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for generating personalized audio advertisements. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A computer-implemented method for providing an audio message with background music, the method comprising:
   selecting a vocal message for presentation to a user of a client device playing a stream of audio content;
   selecting background music to accompany the vocal message, wherein selecting the background music comprises:
      retrieving selection criteria associated with the vocal message, the selection criteria indicating preferences for features of background music to be played with the vocal message;
      obtaining content data describing audio content provided to the client device as part of the stream;
      obtaining a content reference coordinate representing audio features of the audio content described by the content data;
      identifying reference music fulfilling the selection criteria;
      obtaining an audio reference coordinate representing audio features of the reference music fulfilling the selection criteria;
      determining a combined reference coordinate by combining the content reference coordinate and the audio reference coordinate according relative weights specified by the selection criteria;
      selecting the background music from among candidate background music items based on comparisons between the combined reference coordinate and the candidate background music items; and
   providing, to the client device, the selected background music and the selected vocal message, the client device configured to play an audio message comprising the background music played concurrently with the vocal message.

2. The method of claim 1, wherein selecting the background music further comprises:
   obtaining a candidate coordinate representing audio features of a candidate background music item;
   determining a score for the candidate background music item based on a measure of similarity between the combined reference coordinate and the candidate coordinate; and
   selecting the candidate background music item as the background music responsive to the score for the candidate background music item.

3. The method of claim 1, wherein selecting the background music further comprises:
   obtaining a user reference coordinate representing audio features of music preferred by the user of the client device; and
   selecting the background music based on comparisons between the combined reference coordinate, the user reference coordinate, and the candidate background music items.

4. A non-transitory computer-readable storage medium comprising computer program instructions executable by a processor, the instructions for:
   selecting a vocal message for presentation to a user of a client device playing a stream of audio content;
   selecting background music to accompany the vocal message, wherein selecting the background music comprises:
      retrieving selection criteria associated with the vocal message, the selection criteria indicating preferences for features of background music to be played with the vocal message;
      obtaining content data describing audio content provided to the client device as part of the stream;
      obtaining a content reference coordinate representing audio features of the audio content described by the content data;
      identifying reference music fulfilling the selection criteria;
      obtaining an audio reference coordinate representing audio features of the reference music fulfilling the selection criteria;
      determining a combined reference coordinate by combining the content reference coordinate and the audio reference coordinate according relative weights specified by the selection criteria;
      selecting the background music from among candidate background music items based on comparisons between the combined reference coordinate and the candidate background music items; and
   providing, to the client device, the selected background music and the selected vocal message, the client device configured to play an audio message comprising the background music played concurrently with the vocal message.

5. The computer-readable medium of claim 4, wherein selecting the background music further comprises:
   obtaining a candidate coordinate representing audio features of a candidate background music item;
   determining a score for the candidate background music item based on a measure of similarity between the combined reference coordinate and the candidate coordinate; and
   selecting the candidate background music item as the background music responsive to the score for the candidate background music item.

6. The computer-readable medium of claim 4, wherein selecting the background music further comprises:
   obtaining a user reference coordinate representing audio features of music preferred by the user of the client device; and
   selecting the background music based on comparisons between the combined reference coordinate, the user reference coordinate, and the candidate background music items.

7. A system for generating an audio message with background music, the system comprising:
   a processor; and
   a non-transitory computer-readable storage medium comprising computer program instructions executable by the processor, the instructions for:
      selecting a vocal message for presentation to a user of a client device playing a stream of audio content;
      selecting background music to accompany the vocal message, wherein selecting the background music comprises:

retrieving selection criteria associated with the vocal message, the selection criteria indicating preferences for features of background music to be played with the vocal message;

obtaining content data describing audio content provided to the client device as part of the stream;

obtaining a content reference coordinate representing audio features of the audio content described by the content data;

identifying reference music fulfilling the selection criteria;

obtaining an audio reference coordinate representing audio features of the reference music fulfilling the selection criteria;

determining a combined reference coordinate by combining the content reference coordinate and the audio reference coordinate according relative weights specified by the selection criteria;

selecting the background music from among candidate background music items based on comparisons between the combined reference coordinate and the candidate background music items; and providing, to the client device, the selected background music and the selected vocal message, the client device configured to play an audio message comprising the background music played concurrently with the vocal message.

8. The system of claim 7, wherein selecting the background music further comprises:

obtaining a candidate coordinate representing audio features of a candidate background music item;

determining a score for the candidate background music item based on a measure of similarity between the combined reference coordinate and the candidate coordinate; and selecting the candidate background music item as the background music responsive to the score for the candidate background music item.

9. The system of claim 7, wherein selecting the background music further comprises:

obtaining a user reference coordinate representing audio features of music preferred by the user of the client device; and selecting the background music based on comparisons between the combined reference coordinate, the user reference coordinate, and the candidate background music.

10. The method of claim 1, wherein the features of background music to be played with the vocal message comprise audio features.

11. The method of claim 1, wherein the selection criteria further comprise bibliographic information of the reference music.

* * * * *